(12) United States Patent
Vassallo et al.

(10) Patent No.: US 9,274,239 B2
(45) Date of Patent: Mar. 1, 2016

(54) WAVEFIELD DEGHOSTING (71) Applicant: WESTERNGECO L.L.C., Houston, TX (US)

(72) Inventors: Massimiliano Vassallo, Brighton (GB); Dirk-Jan Van Manen, Redhill (GB); Susanne Rentsch-Smith, Hove (GB); Philip A. F. Christie, Fen Drayton (GB)

(73) Assignee: WesternGeco L.L.C., Houston, TX (US)

( * ) Notice: Subject to any disclaimer, the term of this patent is extended or adjusted under 35 U.S.C. 154(b) by 463 days.

(21) Appl. No.: 13/739,877

(22) Filed: Jan. 11, 2013

(65) Prior Publication Data

US 2013/0182536 A1    Jul. 18, 2013

Related U.S. Application Data

(60) Provisional application No. 61/586,509, filed on Jan. 13, 2012.

(51) Int. Cl.
*G01V 1/38* (2006.01)
*G01V 1/36* (2006.01)

(52) U.S. Cl.
CPC ........ *G01V 1/38* (2013.01); *G01V 1/364* (2013.01); *G01V 2210/20* (2013.01); *G01V 2210/56* (2013.01)

(58) Field of Classification Search
CPC ...... G01V 1/38; G01V 1/364; G01V 2210/20
USPC .......................................................... 367/24
See application file for complete search history.

(56) References Cited

U.S. PATENT DOCUMENTS

| 3,673,556 | A | 6/1972 | Biggs |
| 4,353,121 | A | 10/1982 | Ray et al. |
| 4,486,863 | A | 12/1984 | French |

(Continued)

FOREIGN PATENT DOCUMENTS

| EP | 2299296 | 3/2011 |
| GB | 20841446 | 2/1982 |

(Continued)

OTHER PUBLICATIONS

International Search Report and Written Opinion of PCT Application No. PCT/US2013/021356 dated Apr. 29, 2013; pp. 1-9.

(Continued)

*Primary Examiner* — Luke Ratcliffe
(74) *Attorney, Agent, or Firm* — Abimbola Bukoye (57) ABSTRACT

A technique includes receiving sensor acquired data, which includes pressure data representative of at least one pressure measurement of a wavefield and particle motion data representative of at least one particle motion measurement of the wavefield. The technique includes filtering the pressure data and the particle motion data with a plurality of directional filters to provide a plurality of filtered datasets. The filtered datasets are associated with different directional ranges. The technique includes estimating an angle of incidence for at least one of the directional ranges based at least in part on at least one of the filtered datasets; and processing the acquired data to determine at least one of an upgoing component of the wavefield and a downgoing component of the wavefield based at least in part on the at least one estimated angle of incidence.

22 Claims, 4 Drawing Sheets

(56) References Cited

U.S. PATENT DOCUMENTS

| | | | |
|---|---|---|---|
| 4,657,482 A | 4/1987 | Neal | |
| 4,958,328 A | 9/1990 | Stubblefield | |
| 4,992,991 A | 2/1991 | Young et al. | |
| 4,992,992 A | 2/1991 | Dragoset, Jr. | |
| 5,319,609 A | 6/1994 | Regnault | |
| 5,715,213 A | 2/1998 | Allen | |
| 6,024,344 A | 2/2000 | Buckley et al. | |
| 6,088,297 A | 7/2000 | Stottlemyer | |
| 6,151,556 A | 11/2000 | Allen | |
| 6,477,711 B1 | 11/2002 | Freeman et al. | |
| 6,493,636 B1 | 12/2002 | DeKok | |
| 6,671,223 B2 | 12/2003 | Bittleston | |
| 6,678,207 B2 | 1/2004 | Duren | |
| 6,684,160 B1 | 1/2004 | Ozbek et al. | |
| 6,932,017 B1 | 8/2005 | Hillesund et al. | |
| 7,080,607 B2 | 7/2006 | Hillesund et al. | |
| 7,104,728 B2 | 9/2006 | Luc et al. | |
| 7,293,520 B2 | 11/2007 | Hillesund et al. | |
| 7,417,924 B2 | 8/2008 | Vigen et al. | |
| 7,450,467 B2 | 11/2008 | Tveide et al. | |
| 7,480,204 B2 | 1/2009 | Robertsson et al. | |
| 7,660,189 B2 | 2/2010 | Vigen et al. | |
| 7,676,327 B2 | 3/2010 | Ozdemir et al. | |
| 7,755,970 B2 | 7/2010 | Welker et al. | |
| 7,817,495 B2 | 10/2010 | Ozbek et al. | |
| 7,835,225 B2 | 11/2010 | Sollner et al. | |
| 7,957,221 B2 | 6/2011 | Kluver et al. | |
| 7,961,551 B2 | 6/2011 | Robertsson et al. | |
| 7,978,563 B2 | 7/2011 | Thornton et al. | |
| 8,116,166 B2 | 2/2012 | Robertsson et al. | |
| 8,183,868 B2 | 5/2012 | Summerfield et al. | |
| 8,477,561 B2 | 7/2013 | Singh et al. | |
| 8,483,008 B2 | 7/2013 | Welker | |
| 2006/0227657 A1 | 10/2006 | Tveide et al. | |
| 2006/0239117 A1 | 10/2006 | Singh et al. | |
| 2008/0008039 A1 | 1/2008 | Robertsson et al. | |
| 2008/0089174 A1* | 4/2008 | Sollner et al. | 367/21 |
| 2008/0275649 A1 | 11/2008 | Ozdemir et al. | |
| 2008/0285381 A1 | 11/2008 | Moldoveanu et al. | |
| 2008/0316859 A1 | 12/2008 | Welker et al. | |
| 2009/0003132 A1 | 1/2009 | Vassallo et al. | |
| 2009/0067285 A1 | 3/2009 | Robertsson et al. | |
| 2009/0238036 A1 | 9/2009 | Robertsson et al. | |
| 2009/0296523 A1 | 12/2009 | Ozbek et al. | |
| 2010/0027375 A1 | 2/2010 | Barr et al. | |
| 2010/0060286 A1 | 3/2010 | Summerfield et al. | |
| 2010/0118645 A1 | 5/2010 | Welker | |
| 2010/0142317 A1 | 6/2010 | Moldoveanu et al. | |
| 2010/0211319 A1* | 8/2010 | Van Manen et al. | 702/14 |
| 2010/0238762 A1 | 9/2010 | Hornbostel | |
| 2011/0015924 A1 | 1/2011 | Gunel Hacihabiboglu et al. | |
| 2011/0044131 A1 | 2/2011 | Thornton et al. | |
| 2011/0242937 A1 | 10/2011 | Sollner et al. | |
| 2013/0028045 A1 | 1/2013 | Ferber | |
| 2013/0030709 A1 | 1/2013 | Ferber | |
| 2013/0107663 A1 | 5/2013 | Moldoveanu et al. | |

FOREIGN PATENT DOCUMENTS

| | | |
|---|---|---|
| GB | 2303705 | 2/1997 |
| GB | 2320706 | 7/1998 |
| GB | 2379741 | 3/2003 |
| WO | 2008102134 A2 | 8/2008 |
| WO | 2013116195 A1 | 8/2013 |

OTHER PUBLICATIONS

International Search Report and Written Opinion of PCT Application No. PCT/U82012/048759 dated Oct. 18, 2012; pp. 1-7.

International Search Report and Written Opinion of PCT Application No. PCT/U82012/048761 dated Oct. 18, 2012; pp. 1-7.

Aytun, "The Footsteps of the Receiver Ghost in the F-K Domain", Geophysics, vol. 64(5), 1999, pp. 1618-1626.

Posthumus, "Deghosting Using a Twin Streamer Configuration", Geophysical Prospecting, vol. 41, 1993, pp. 267-286.

Robertsson, "Rough Sea Deghosting Using a Single Streamer and a Pressure Gradient Approximation", Geophysics, vol. 67, 2002, pp. 2005-2011.

Soubaras, "Deghosting by Joint Deconvolution of a Migration and a Mirror Migration", SEG Denver Annual Meeting, 2010: pp. 3406-3410.

Supplementary Search Report for corresponding EP App No. 137359675, Jan. 5, 2016, 4 pages.

* cited by examiner

WAVEFIELD DEGHOSTING

CROSS-REFERENCE TO RELATED APPLICATION

This application claims the benefit of U.S. Provisional Patent Application Ser. No. 61/586,509 filed Jan. 13, 2012, which is incorporated herein by reference in its entirety.

BACKGROUND

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensor, both hydrophones and geophones, and/or other suitable sensor types. A typical measurement acquired by a sensor contains desired signal content (a measured pressure or particle motion, for example) and an unwanted content (or "noise").

SUMMARY

The summary is provided to introduce a selection of concepts that are further described below in the detailed description. This summary is not intended to identify key or essential features of the claimed subject matter, nor is it intended to be used as an aid in limiting the scope of the claimed subject matter.

In an example implementation, a technique includes receiving sensor acquired data, which includes pressure data representative of at least one pressure measurement of a wavefield and particle motion data representative of at least one particle motion measurement of the wavefield. The technique includes filtering the pressure data and the particle motion data with a plurality of directional filters to provide a plurality of filtered datasets. The filtered datasets are associated with different directional ranges. The technique includes estimating an angle of incidence for at least one of the directional ranges based at least in part on at least one of the filtered datasets; and processing the acquired data to determine at least one of an upgoing component of the wavefield and a downgoing component of the wavefield based at least in part on the at least one estimated angle of incidence.

In another example implementation, a technique includes receiving acquired data representative of a wavefield that results from energy from at least one controlled energy source propagating into a subsurface three-dimensional geologic formation. The data is acquired using a towed marine seismic streamer that includes a pressure sensor and a particle motion sensor, and the data includes pressure data that is representative of at least one pressure measurement and particle velocity data that is representative of at least one particle velocity measurement. The technique includes decomposing at least part of the particle velocity data to generate horizontal component particle motion data representative of a horizontal component of particle motion; and filtering the pressure data and the horizontal component particle motion data with a plurality of directional filters to provide a plurality of filtered datasets. Each of the filtered datasets is associated with a directional range of a plurality of different directional ranges, and the plurality of filtered datasets includes filtered particle motion datasets. The technique includes estimating a three-dimensional angle of incidence for each of the directional ranges based at least in part on the filtering of the horizontal particle motion data; scaling the filtered particle motion datasets based at least in part on the estimated three-dimensional angles of incidence to provide scaled components; and deghosting the wavefield, where the deghosting includes combining the scaled components to determine an upgoing wavefield component for each of the directional ranges and merging the determined upgoing wavefield components together to determine an upgoing component of the wavefield.

In another example implementation, a system includes an interface and a processor. The interface is adapted to receive acquired data corresponding to wavefield received from a subsurface three-dimensional geologic formation. The data is acquired with a towed marine seismic streamer that includes a pressure sensor and a particle motion sensor, and the acquired data includes pressure data that is representative of at least one pressure measurement and particle velocity data that is representative of at least one particle velocity measurement. The processor is adapted to decompose at least part of the particle velocity data to generate horizontal component particle motion data that is representative of a horizontal component of particle motion; filter the pressure data and the horizontal component particle motion data with a plurality of directional filters to provide a plurality of filtered datasets, where each of the filtered datasets is associated with a directional range of a plurality of different directional ranges and the plurality of filtered datasets includes filtered particle motion datasets. The processor is further adapted to estimate a three-dimensional angle of incidence for each of the directional ranges based at least in part on the filtering of the horizontal particle motion data; scale the particle motion filtered datasets based at least in part on the estimated three-dimensional angles of incidence to provide scaled components; and selectively combine the scaled components to separate the wavefield into at least an upgoing component of the wavefield.

In yet another example implementation, a system includes an interface and a processor. The interface is adapted to receive acquired data corresponding to wavefield received from a subsurface three-dimensional geologic formation. The data is acquired with a towed marine seismic streamer that includes a pressure sensor and a particle motion sensor, and the acquired data includes pressure data that is representative of at least one pressure measurement and particle velocity data that is representative of at least one particle velocity measurement. The processor is adapted to decompose at least part of the particle velocity data to generate horizontal component particle motion data that is representative of a horizontal component of particle motion; filter the pressure data and the horizontal component particle motion data with a plurality of directional filters to provide a plurality of filtered datasets, where each of the filtered datasets being associated with a directional range of a plurality of different directional ranges, the plurality of filtered datasets comprising filtered particle motion datasets; estimate a three-dimensional angle of incidence for each of the directional ranges based at least in part on the filtering of the horizontal particle motion data; scale the particle motion filtered datasets based at least in part on the estimated three-dimensional angles of incidence to provide scaled components; and selectively combine the scaled components to separate the wavefield into at least an upgoing component of the wave field.

In alternative or further implementations, the data is acquired using a towed marine seismic streamer that includes a pressure sensor and a particle motion sensor, and the data corresponds to a subsurface three-dimensional geologic formation.

In alternative or further implementations, the technique further includes scaling at least one dataset of the plurality of filtered datasets based at least in part on the at least one estimated angle of incidence; and processing the acquired data includes processing the acquired data based at least in part on a result of the scaling.

In alternative or further implementations, scaling the at dataset(s) includes generating a plurality of scaled components of the filtered datasets according to an operator that compensates for at least a dip-related amplitude reduction and is a function of the at least one angle of incidence; and processing the acquired data further includes combining the scaled components.

In alternative or further implementations, processing the acquired data includes merging the upgoing component and the downgoing component into a complete representation of the wavefield.

In alternative or further implementations, the particle motion data includes particle velocity data that is representative of at least one particle velocity measurement; the technique further includes decomposing the particle velocity data to generate horizontal particle velocity data representative of a horizontal component of particle motion; and filtering the particle motion data includes filtering the horizontal particle velocity data.

In alternative or further implementations, estimating the at least one angle of incidence comprises estimating at least one three-dimensional angle of incidence.

In alternative or further implementations, filtering the pressure data includes filtering at least one of inline pressure gradient data and crossline pressure gradient data.

In alternative or further implementations, the technique includes filtering the filtered datasets using a bandpass filter to regulate a signal-to-noise ratio.

In alternative or further implementations, the technique includes using a picking technique to selectively retain and discard the filtered datasets.

Advantages and other features will become apparent from the following drawing, description and claims.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description herein is for the purpose of describing particular embodiments only and is not intended to be limiting of the invention. As used in the description and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Deghosting systems and techniques are disclosed herein for purposes of separating the upgoing and downgoing components of a wavefield sensed, or measured, at various locations by receivers, or sensors, of a seismic data acquisition system. More particularly, in accordance with example implementations, the sensors sense pressure data and particle motion data, which are processed and directionally filtered to estimate a three-dimensional (3-D) angle of incidence for each directional range. The 3-D angles of incidence are used to estimate the upgoing and downgoing components of the sensed wavefield.

Figure 1:
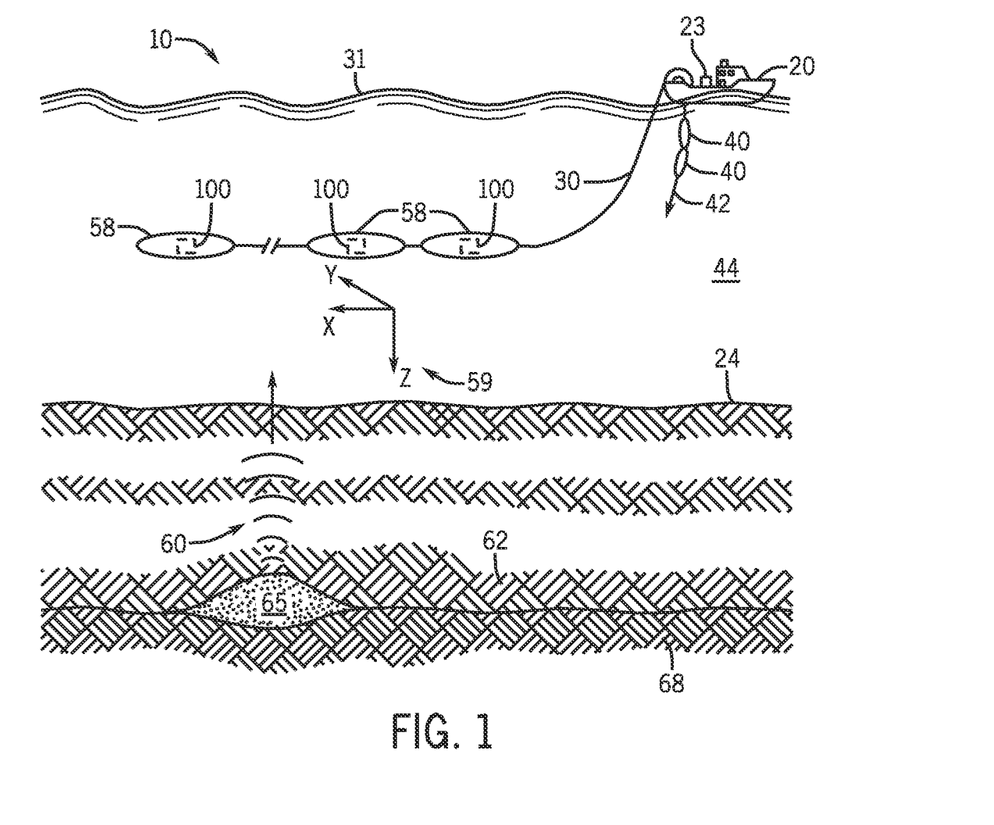
FIG. 1 is a schematic diagram of a seismic acquisition system according to an example implementation.

Seismic data acquisition systems may be land-based, seabed-based, borehole-based and so forth, depending on the particular implementation. For the examples disclosed herein, the seismic data acquisition system is a marine-based towed seismic data acquisition system, although another seismic data acquisition system may be used, in accordance with other implementations. More specifically, FIG. 1 depicts a marine-based seismic data acquisition system 10, in accordance with an example implementation. In the system 10, a survey vessel 20 tows one or more seismic streamers 30 (one example streamer 30 being depicted in FIG. 1) behind the vessel 20. It is noted that the streamers 30 may be arranged in an array, or spread, in which multiple streamers 30 are towed in approximately the same plane at the same depth. As another example, the streamers may be towed at multiple depths, such as in an over/under spread, for example. Moreover, the streamers 30 of the spread may be towed in a coil acquisition configuration and/or at varying depths or slants, depending on the particular implementation.

The streamer 30 may be several thousand meters long and may contain various support cables (not shown), as well as wiring and/or circuitry (not shown) that may be used to support communication along the streamer 30. In general, the streamer 30 includes a primary cable into which is mounted seismic sensors that record seismic signals. In accordance with example implementations, the streamer 30 contains seismic sensor units 58, each of which contains one or multiple multi-component sensors 100. The multi-component sensor 100 includes a hydrophone and particle motion sensors, in accordance with some embodiments of the invention. Thus, each multi-component sensor 100 is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular implementation, the multi-component sensor 100 may include one or more hydrophones, geophones, particle displacement sensors, particle velocity sensors, accelerometers, pressure gradient sensors, or combinations thereof.

As a more specific example, in accordance with some implementations, a particular multi-component sensor 100 may include a hydrophone for measuring pressure and three orthogonally-aligned accelerometers to measure three corresponding orthogonal components of particle velocity and/or acceleration near the sensor. It is noted that the multi-component sensor 100 may be implemented as a single device (as depicted in FIG. 1) or may be implemented as a plurality of devices, depending on the particular embodiment of the invention. A particular multi-component sensor 100 may also include pressure gradient sensors, which constitute another type of particle motion sensors. Each pressure gradient sensor measures the change in the pressure wavefield at a particular point with respect to a particular direction.

In addition to the streamer(s) 30 and the survey vessel 20, the marine seismic data acquisition system 10 includes at least one seismic source 40, such as the two example seismic sources 40 that are depicted in FIG. 1, such as air guns and the like. In some implementations, the seismic sources 40 may be coupled to, or towed by, the survey vessel 20. Alternatively, in other implementations, the seismic sources 40 may operate independently of the survey vessel 20, in that the sources 40 may be coupled to other vessels or buoys, as just a few examples.

As the seismic streamers 30 are towed behind the survey vessel 20, the seismic sources 40 are activated, or fired, to produce acoustic signals 42 (an example acoustic signal 42 being depicted in FIG. 1), often referred to as "shots," which propagate down through a water column 44 into strata 62 and 68 beneath a water bottom surface 24. The acoustic signals 42 are reflected from the various subterranean geologic formations, such as an example formation 65 that is depicted in FIG. 1.

The incident acoustic signals 42 that are created by the seismic sources 40 produce corresponding reflected acoustic signals, or pressure waves 60, which are sensed by the seismic sensors of the streamer(s) 30. It is noted that the pressure waves that are received and sensed by the seismic sensors include "upgoing" pressure waves that propagate to the sensors without reflection, as well as "downgoing" pressure waves that are produced by reflections of the pressure waves 60 from the air-water boundary, or free surface 31.

The multicomponent sensors 100 generate "traces," or signals (digital signals, for example), which form the acquired, spatially and temporally sampled measurements of the pressure wavefield and particle motion. The traces are recorded as seismic data and may be at least partially processed by a signal processing unit 23 that is deployed on the survey vessel 20, in accordance with some implementations. For example, a particular multi-component sensor 100 may provide a trace, which corresponds to a measure of a pressure wavefield by its hydrophone; and the sensor 100 may provide (depending on the particular implementation) one or more traces that correspond to one or more components of particle motion.

A goal of the seismic acquisition may be to build up an image of a survey area for purposes of identifying subterranean geological formations, such as the example geological formation 65. Subsequent analysis of the representation may reveal probable locations of hydrocarbon deposits in subterranean geologic formations. Moreover, the seismic data may be processed to determine an elastic model and identify formation properties, fluid properties and the lithology of the formation. Depending on the particular implementation, portions of the analysis of the seismic data may be processed by a local data processing system on the seismic survey vessel 20 (such as by the signal processing unit 23) or may be processed by a remote seismic data processing system (the data processing system 320 of FIG. 4, described further below, for example) that may be, for example, located on land or on the vessel 20. Thus, many variations are possible and are within the scope of the appended claims.

In general, systems and techniques are disclosed herein for purposes of deghosting the acquired seismic data, i.e., separating a wavefield (called an "upgoing wavefield") that is represented by the acquired multi-component seismic data into its upgoing and downgoing (called a "downgoing wavefield") components. In this manner, techniques and systems are disclosed herein for purposes of achieving three-dimensional (3-D) wavefield separation using relatively computationally efficient and flexible techniques that, in accordance with example implementations, are not generally affected by spatial sampling limitations or weather-related effects.

One way to performing the deghosting is to mathematically combine (add together, for example), the pressure and the vertical particle velocity measurements, as filtered by the appropriate operator(s). This approach takes advantage of the relative polarities between the upgoing and downgoing wavefields: the upgoing and downgoing pressure wavefields having an opposite polarity; and the upgoing and downgoing particle velocity wavefields having the same polarity. More specifically, the free surface 31 reflects the pressure wavefield with a reflection coefficient that is negative (a reflection coefficient that may be close to −1, for example). The resulting reversed, or reflected, pressure wavefield propagates downwardly. In other words, the reflected pressure wavefield (the downgoing pressure wavefield) propagates in the opposite vertical direction than the vertical direction in which the upgoing wavefield propagates. Both the upgoing and downgoing wavefields are measured by a given pressure sensor with opposite polarities. However, the opposite polarity combined with the opposite directionality causes a given vertical velocity sensor to perceive the downgoing wavefield with the same sign as the upgoing wavefield.

In the frequency-wavenumber domain, the relationship between the upgoing pressure wavefield, the measured total pressure wavefield and the vertical velocity wavefield may be described as follows:

$$P^{up}(\omega,k_x,k_y)=P(\omega,k_x,k_y)+H(\omega,k_x,k_y)V_z(\omega,k_x,k_y), \quad \text{Eq. 1}$$

where "$P^{up}(\omega,k_x,k_y)$" represents the upgoing pressure wavefield (which is not measured); "$P(\omega,k_x,k_y)$" represents the measured total pressure; "$V_z(\omega,k_x,k_y)$" represents the measured vertical velocity wavefield; "$H(\omega,k_x,k_y)$" represents an operator that is applied to the $V_z(\omega,k_x,k_y)$ vertical velocity wavefield to convert the $V_z(\omega,k_x,k_y)$ vertical velocity wavefield into the proper pressure units and to compensate a dip-related reduction in amplitude, which is implicitly perceived by the directional sensor along the vertical axis; "$k_x$" represents the inline wavenumber; "$k_y$" represents the crossline wavenumber; and "$\omega$" represents the temporal frequency (in radians per second).

The operator $H(\omega,k_x,k_y)$ may also be used to estimate the downgoing pressure wavefield (called "$P^{down}(\omega,k_x,k_y)$"), using the relationship that is described below:

$$P^{down}(\omega,k_x,k_y) = P(\omega,k_x,k_y) - H(\omega,k_x,k_y)V_z(\omega,k_x,k_y). \quad \text{Eq. 2}$$

The $H(\omega,k_x,k_y)$ operator may be described as follows:

$$H(\omega k_x, k_y) = \frac{\rho\omega}{k_z(\omega, k_x, k_y)}, \quad \text{Eq. 3}$$

where "$\rho$" represent the density of the medium (i.e., sea water); and "$k_z$" represents the vertical wavenumber. The $k_z$ vertical wavenumber may be described as follows:

$$k_z(\omega, k_x, k_y) = \sqrt{\left(\frac{\omega}{c}\right)^2 - k_x^2 - k_y^2}, \quad \text{Eq. 4}$$

where "c" represents the propagation velocity in the medium (i.e., sea water).

It is noted that in Eqs. 1 to 4, no assumptions are made about the roughness of the sea, and a model of the downgoing reflection is not applied.

In the particular case of a seismic event propagating vertically, Eq. 4 reduces to $k_z(\omega,k_x,k_y)=k_z(\omega)=\omega/c$; and, by consequence, Eq. 3 may be simplified and represented in the spatial-time domain as follows:

$$H(\omega,k_x,k_y) = H = H(t,x,y) = \rho c, \quad \text{Eq. 5}$$

where "t" represents time; "x" represents the inline coordinate; and "y" represents the crossline coordinate.

In the more generic case of a seismic event propagating at a generic angle, Eq. 4 may be rewritten as follows:

$$k_z(\omega, k_x, k_y) = \sqrt{\left(\frac{\omega}{c}\right)^2 - \left(\frac{\omega}{c}\sin\alpha\sin\theta\right)^2 - \left(\frac{\omega}{c}\cos\alpha\sin\theta\right)^2} \quad \text{Eq. 6}$$

$$= \frac{\omega}{c}\cos\theta,$$

where "$\alpha$" represents the azimuthal angle of propagation in the inline/crossline plane (i.e., the x-y plane (see axes 59 of FIG. 1)); and "$\theta$" represents the elevation angle of propagation, herein called the "angle of incidence," with respect to the vertical axis (z).

Moreover, Eq. 3 may be simplified as follows:

$$H(\omega, k_x, k_y) = H = H(t, x, y) = \frac{\rho c}{\cos\theta}. \quad \text{Eq. 7}$$

In view of Eq. 7, if the angle of incidence $\theta$ is precisely known for every event measured on a multi-component seismic trace, the upgoing wavefield component may be correctly separated from the downgoing wavefield component without any approximation by merely combining the pressure and vertical velocity measurements. In this manner, if the angle of incidence $\theta$ of the measured wavefield is known at every time and space sample (i.e., at every $\theta(t,x,y)$), the correct scalar correction may be applied to the vertical velocity measurements at every time and space sample to derive the $P^{up}(t,x,y)$ upgoing pressure component and the $P^{down}(t,x,y)$ downgoing pressure component, as described below:

$$P^{up}(t, x, y) = P(t, x, y) + \frac{\rho c}{\cos\theta(t, x, y)}V_z(t, x, y), \text{ and} \quad \text{Eq. 8}$$

$$P^{down}(t, x, y) = P(t, x, y) - \frac{\rho c}{\cos\theta(t, x, y)}V_z(t, x, y). \quad \text{Eq. 9}$$

However, the angle of incidence $\theta$ may not be known at every time and space sample. Therefore, the dip compensation of the vertical velocity may be performed in the frequency-wavenumber domain, pursuant to Eqs. 3 and 4. Due to spatial aliasing in the crossline direction, approximations and/or assumptions are typically used to model the effect of the $k_y$ crossline wavenumber, as the crossline spectrum of the wavefield may not be directly extracted from the pressure and vertical velocity measurements. Common assumptions may be that either two-dimensional (2-D) propagation (i.e., propagation along the inline direction only where "$k_y=0$") or radial propagation occurs, where the crossline component is estimated from the inline component considering the wave propagating only along the radial direction between the source and each receiver. Such assumptions do not, however, take into account the effects of complex reflections in the crossline direction.

In accordance with example implementations, techniques and systems are disclosed herein for purposes of estimating the $\theta$ angle of incidence from particle motion measurements. For example, in accordance with example implementations, techniques, such as the techniques disclosed in U.S. Patent Application Publication No. US 2009/0031321 A1, entitled, "ESTIMATING AND USING SLOWNESS VECTOR ATTRIBUTES IN CONNECTION WITH A MULTI-COMPONENT SEISMIC GATHER," filed on Jun. 29, 2007, may be used. As described in U.S. Patent Application Publication No. US 2009/00031321 A1, a combination of pressure and horizontal velocities may be used to derive a relatively efficient and robust estimate for the directional slowness of an event measured at any given time sample on a given seismic trace. In this manner, in general, the directional slowness (herein called "p") of a seismic event may be estimated locally in time and space, as follows:

$$p_y(t, x, y) = \frac{\partial P(t, x, y)/\partial y}{dP(t, x, y)/dt} = \rho\frac{dV_y(t, x, y)/dt}{dP(t, x, y)/dt}, \text{ and} \quad \text{Eq. 10}$$

$$p_x(t, x, y) = \frac{\partial P(t, x, y)/\partial x}{dP(t, x, y)/dt} = \rho\frac{dV_x(t, x, y)/dt}{dP(t, x, y)/dt}, \quad \text{Eq. 11}$$

where "$p_y(t,x,y)$" represents the crossline slowness and "$p_x(t,x,y)$" represents the inline slowness. As set forth in Eqs. 10 and 11, a relatively reliable estimate of the slowness may be achieved directly in time and space from multi-component seismic measurements.

The use of a directional component of the pressure gradient (when known) may be used to compensate the information of particle velocity: the equation of motion relates the motion of the particles in the medium with the gradient of the pressure wavefield. For practical reasons, the inline component of the particle velocity in a towed streamer may be adversely affected by relatively strong noise due to streamer motion and hence, hardly being usable for fine processing purposes. Therefore, in the inline direction, the inline gradient may be used by detaining the inline gradient directly by applying a derivative operator to the measured pressure. This may be possible if the sampling of the pressure wavefield in the inline direction is sufficient to avoid spatial aliasing and undesired artifacts/side effects.

In the crossline direction, however, the particle velocity is less affected by streamer motion-related noise, as compared to the inline component of particle velocity. The crossline particle velocity may therefore be used instead of the crossline gradient obtained from pressure because a correct determination of the crossline gradient may be relatively difficult through the use of a spatial derivative operator due to crossline aliasing.

The slowness estimates may be derived by determining the ratio of time derivatives of pressure and particle velocity or pressure spatial gradients. However, as further disclosed below, some pre-processing and post-processing operations may be performed to enhance the signal-to-noise ratio in the input traces, reduce the likelihood of crossing events that may mislead the estimate and remove eventual outliers from the estimates. In this manner, the $p_y(t,x,y)$ crossline slowness (Eq. 10) and the $p_x(t,x,y)$ inline slowness (Eq. 11) may be used to estimate the incidence angle $\theta(t,x,y)$ at the sample positions, as described below:

$$\theta(t,x,y) = \arcsin(c\sqrt{p_x^2(t,x,y) + p_y^2(t,x,y)}).\qquad \text{Eq. 12}$$

Considering Eqs. 8 to 12, in accordance with example implementations, three-dimensional (3-D) deghosting may be achieved, locally in the time-space domain, without the use of a ghost reflection model (i.e., using a flat sea assumption), without being affected by spatial sampling-related artifacts (i.e., crossline aliasing) and without relying on any assumption about horizontal propagation (i.e., the radial propagation from the source), as set forth below:

$$P^{up}(t,x,y) = P(t,x,y) + \frac{\rho c}{\cos\left[\arcsin\left(c\sqrt{\left(\frac{\partial P(t,xx,y)/\partial x}{dP(t,x,y)/dt}\right)^2 + \left(\rho\frac{dV_y(t,x,y)/dt}{dP(t,x,y)/dt}\right)^2}\right)\right]} V_z(t,x,y) \qquad \text{Eq. 13}$$

Equation 13 uses the inline gradient of pressure ($\partial P(t,x,y)$) and the crossline component of particle velocity ($dV_y(t,x,y)$). Depending on acquisition geometry and the available data, however, the directional spatial gradient and the directional particle velocity (or acceleration or motion) may be used equivalently in different combinations, as can be appreciated by the skilled artisan.

The above-described analysis assumes a single event, meaning that the analysis assumes that for a given sample, the measured energy is related to a single seismic event. However, a given seismic sensor may sense multiple seismic events (called "overlapping seismic events" herein) that overlap in space and time. Therefore, applying a single event-based processing technique to data representative of time and space overlapping seismic events may introduce significant errors. Systems and techniques are disclosed herein for purposes of taking into account overlapping seismic events.

Figure 2:
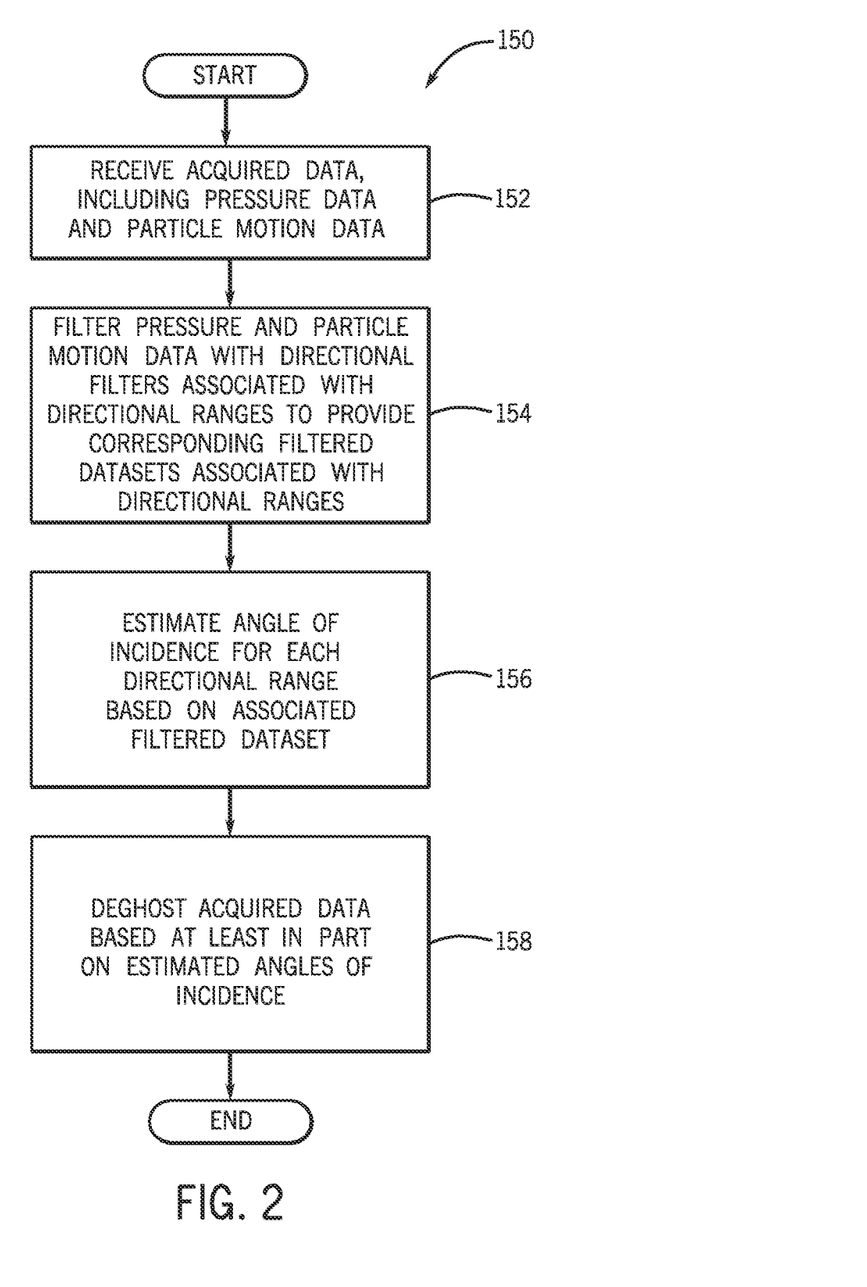
FIGS. 2 and 3 are flow diagrams illustrating deghosting techniques according to example implementations.

More specifically, referring to FIG. 2, in accordance with an example implementation, a technique 150 includes receiving (block 152) data acquired in a marine, towed seismic survey (as an example), including pressure data and particle motion data. The technique 150 includes filtering (block 154) the pressure and particle motion data with directional filters, which are associated with directional ranges to provide corresponding filtered datasets that are associated with the directional ranges. Thus, each filtered dataset represents a corresponding set of non-overlapping seismic events. According to the technique 150, an angle of incidence is estimated (block 156) for each directional range based on an associated filtered dataset. The acquired data may then be deghosted, pursuant to block 158, based at least in part on the estimated angles of incidence.

Figure 3:
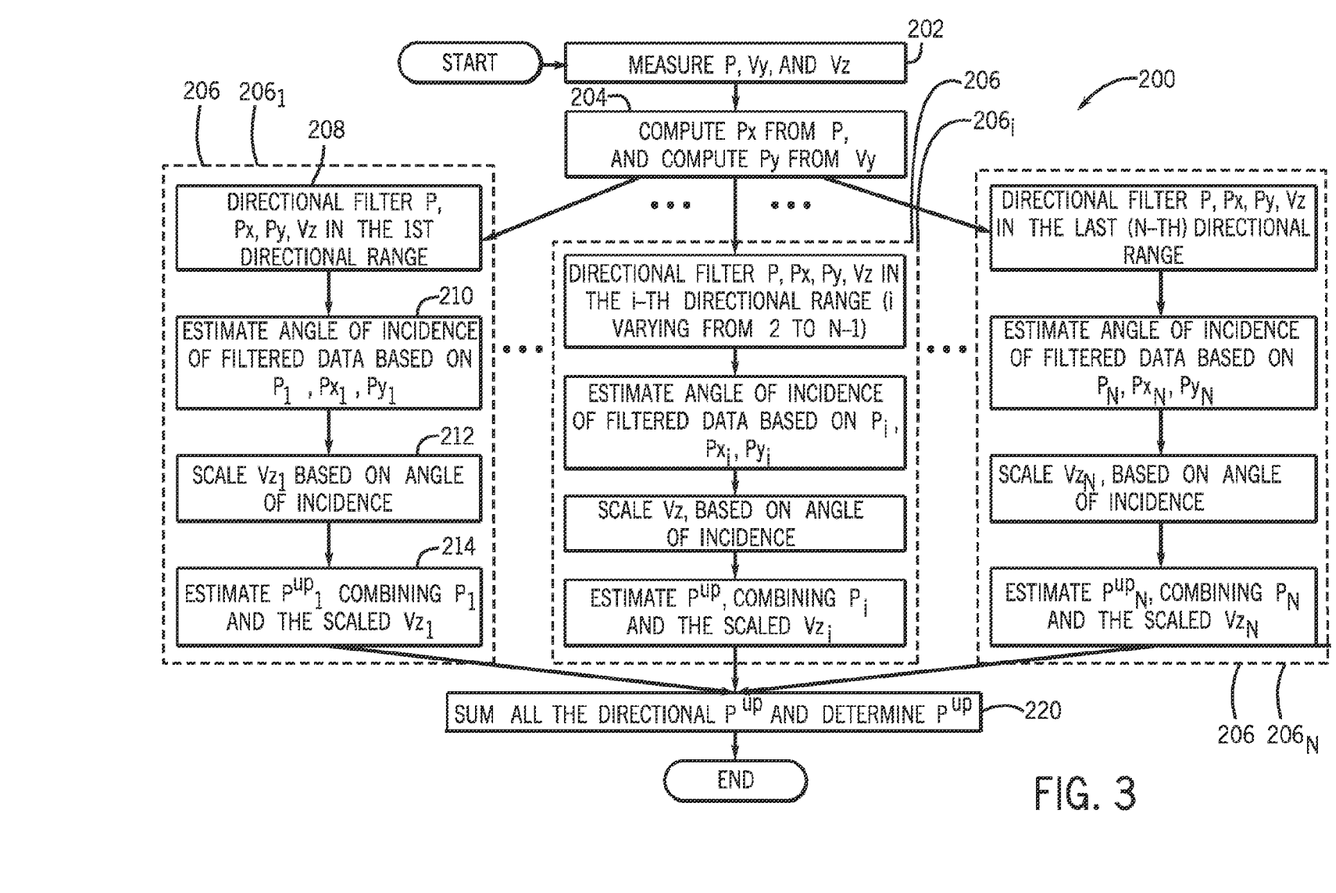

As a more specific example, FIG. 3 depicts a deghosting workflow 200 in accordance with an example implementation. Pursuant to the workflow 200, data is acquired from a towed, seismic survey representative of pressure (P) measurements and particle motion-related measurements, such as crossline particle velocity measurements ($V_y$) and vertical particle velocity measurements ($V_z$).

Next, pursuant to the workflow 200, pressure gradients are determined: an inline pressure gradient (called "$P_x$") determined from the P pressure measurements, as well as a crossline pressure gradient (called "$P_y$") determined from $V_y$ crossline particle velocity measurements. Next, the P pressure, $P_x$ inline pressure gradient, $P_y$ crossline pressure gradient and $V_z$ vertical velocity components are filtered by N filter banks (filter banks $206_1 \ldots 206_i \ldots 206_N$, being depicted in FIG. 3 as examples), each of which is associated with a different directional range. In this regard, in accordance with example implementations, each filter bank 206 has an associated directional range and operates as follows. First, the P pressure, $P_x$ inline pressure gradient, $P_y$ crossline pressure gradient and $V_z$ vertical particle velocity components are filtered in the directional range associated with the filter bank 206; and then, the $\theta$ angle of incidence of the filtered data may be estimated (block 210) based on the filtered P pressure, $P_x$ inline pressure gradient and $P_y$ crossline pressure gradient component. For the notation of FIG. 3, block 208 produces a set of N filtered signals ($P_i$, $Py_i$, $Px_i$, and $Vz_i$) where "i" indicates the i-th dataset of the N set of signals.

Each set of filtered signals represents a set of events having similar apparent velocities along their inline directions: these are by definition almost-parallel and hence, relatively unlikely to be overlapping. The filter bank 208 therefore reinforces the non-overlapping seismic event assumption used in the deghosting analysis that is set forth above.

Block 210, which estimates the $\theta$ angle of incidence may use, for example, Eqs. 10-12, as set forth above. It is noted that in accordance with example implementations, before the $\theta$ angle of incidence is estimated, a bandpass filter may be applied on the filtered P pressure, Px inline pressure gradient and Py crossline pressure gradient to select a portion of the bandwidth having an optimized signal-to-noise ratio (SNR).

It is noted that a picking technique may be used to select samples of each filtered dataset that contains seismic energy and discard other filtered samples, in accordance with some example implementations. The $\alpha i(ti,xi)$ azimuthal angles and $\theta i(ti,xi)$ angles of incidence estimated for each directional range at samples (ti,xi) where seismic events are picked are retained. The filtered Vz, vertical velocity is selected according to $$"\frac{\rho c}{\cos\theta_i(t, x, y)},"$$

as set forth in Eq. 8, based on the θ angle of incidence, according to block 212. Thus, using the scaled, filtered Vzi vertical particle velocity, Eq. 13 may be applied to each directional subset to obtain the directionally-filtered component of the upgoing wavefield, or "$P_i^{UP}$," as set forth in block 214.

After the $P_i^{UP}$ directionally-filtered components are determined for the different directions, the $P_i^{UP}$ directional upgoing wavefield components may be added together to obtain the composite, or total, $P^{UP}$ upgoing wavefield, pursuant to block 220.

Figure 4:
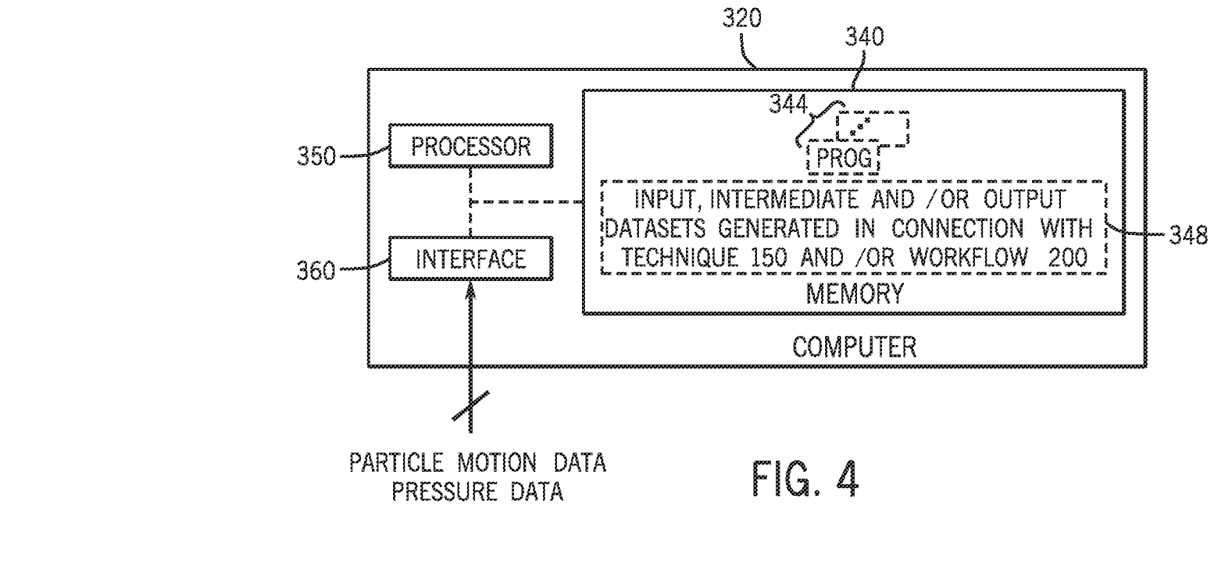
FIG. 4 is a schematic diagram of a data processing system according to an example implementation.

Referring to FIG. 4, in accordance with some implementations, a machine, such as a data processing system 320, may contain a processor 350 for purposes of processing acquired seismic data to perform deghosting, as disclosed herein.

In accordance with some implementations, the processor 350 may be formed from one or more microprocessors and/or microprocessor processing cores and thus, may be itself be formed from multiple processors. In general, the processor 350 is a general purpose processor, and may be formed from, depending on the particular implementation, one or multiple Central Processing Units (CPUs), or application specific integrated circuits (ASICs), field programmable gate arrays (FPGAs), programmable logic devices (PLDs), or other appropriate devices, as can be appreciated by the skilled artisan. As a non-limiting example, the processor 350 may be part of the circuitry 23 on the vessel 20, or may be disposed at a remote site. Moreover, the data processing system 320 may be a distributed processing system, in accordance with further implementations.

As depicted in FIG. 4, the processor 350 may be coupled to a communication interface 360 for purposes of receiving such data as particle motion data (particle velocity data such as crossline particle velocity data and vertical particle velocity data, as examples) as well as pressure data, which were acquired by sensors in a marine, towed seismic survey. As examples, the communication interface 360 may be a Universal Serial Bus (USB) interface, a network interface, a removable media interface (a flash card, CD-ROM interface, etc.) or a magnetic storage interface (an Intelligent Device Electronics (IDE)-compliant interface or Small Computer System Interface (SCSI)-compliant interface, as non-limiting examples). Thus, the communication interface 360 may take on numerous forms, depending on the particular implementation.

In accordance with some implementations, the processor 350 is coupled to a memory 340 that stores program instructions 344, which when executed by the processor 350, may cause the processor 350 to perform various tasks of one or more of the techniques and systems that are disclosed herein, such as the technique 150 and/or workflow 200. As a non-limiting example, in accordance with some implementations, the instructions 344, when executed by the processor 350, may cause the processor 350 to receive acquired data corresponding to a subsurface three-dimensional geologic formation, where the data is acquired with a towed marine seismic streamer that includes a pressure sensor and a particle motion sensor and the acquired data includes pressure data that is representative of at least one pressure measurement and particle motion data that is representative of at least one particle motion measurement. The instructions 344, when executed by the processor 350 may further cause the processor 350 to filter the pressure data and the particle motion data with a plurality of directional filters to provide a plurality of filtered datasets, which each of the filtered datasets being associated with a different directional range. The instructions 344, when executed by the processor 350 may further cause the processor 350 to estimate an angle of incidence for at least one of the directional ranges based at least in part on a filtered dataset and deghost the acquired data based at least in part on the at least one estimated angle of incidence.

In general, the memory 340 is a non-transitory storage device and may take on numerous forms, such as (as non-limiting examples) semiconductor storage, magnetic storage, optical storage, phase change memory storage, capacitor-based storage, and so forth, depending on the particular implementation. Moreover, the memory 340 may be formed from more than one of these non-transitory memories, in accordance with further implementations. When executing one or more of the program instruction 344, the processor 350 may store preliminary, intermediate and/or final datasets 348 obtained via the execution of the instructions 344 in the memory 340.

It is noted that the data processing system 320 is merely an example of one out of many possible architectures, in accordance with the techniques and systems that are disclosed herein. Moreover, the data processing system 320 is represented in a simplified form, as the processing system 320 may have various other components (a display to display initial, intermediate and/or final results of the system's processing, as non-limiting examples), as can be appreciated by the skilled artisan.

Other variations are contemplated, which are within the scope of the appended claims. In this regard, although FIG. 1 depicts a towed seismic survey system, the system and techniques that are disclosed herein may be applied to other types of seismic acquisition systems, such as seabed-based seismic acquisition systems, land-based seismic acquisition systems, seismic acquisition systems deployed in/in connection with a well, and so forth.

While a limited number of examples have been disclosed herein, those skilled in the art, having the benefit of this disclosure, will appreciate numerous modifications and variations therefrom. It is intended that the appended claims cover all such modifications and variations.

What is claimed is:
1. A method comprising:
receiving sensor acquired data including pressure data representative of at least one pressure measurement of a wavefield and particle motion data representative of at least one particle motion measurement of the wavefield, wherein the wavefield results from energy from at least one energy source, the energy propagating into a subsurface three-dimensional geologic formation;
filtering the pressure data and the particle motion data with a plurality of directional filters to provide a plurality of filtered datasets, the filtered datasets being associated with different directional ranges;
estimating an angle of incidence for at least one of the directional ranges based at least in part on at least one of the filtered datasets;
scaling at least one dataset of the plurality of filtered datasets based at least in part on the angle of incidence estimated for at least one of the directional ranges; and
processing the acquired data to determine at least one of an upgoing component of the wavefield and a downgoing component of the wavefield based at least in part on the at least one estimated angle of incidence and based at least in part on a result of the scaling.

2. The method of claim 1, wherein the data is acquired using a towed marine seismic streamer that includes a pressure sensor and a particle motion sensor, and the data corresponds to a subsurface three-dimensional geologic formation.

3. The method of claim 1, further comprising:
determining a model of the subsurface three-dimensional geologic formation based at least partially on one or more of the upgoing component of the wavefield and the downgoing component of the wavefield.

4. The method of claim 1, wherein:
scaling at least one dataset comprises generating a plurality of scaled components of the filtered datasets according to an operator that compensates for at least a dip-related amplitude reduction and is a function of the at least one angle of incidence; and
processing the acquired data further comprises combining the scaled components.

5. The method of claim 1, wherein processing the acquired data comprises merging the upgoing component and the downgoing component into a complete representation of the wavefield.

6. The method of claim 1, wherein the particle motion data comprises particle velocity data representative of at least one particle velocity measurement, the method further comprising:
decomposing the particle velocity data to generate horizontal particle velocity data representative of a horizontal component of particle motion,
wherein filtering the particle motion data comprises filtering the horizontal particle velocity data.

7. The method of claim 1, wherein estimating the at least one angle of incidence comprises estimating at least one three-dimensional angle of incidence.

8. The method of claim 1, further comprising:
determining at least one of formation properties, fluid properties, or lithography of the subsurface three-dimensional geologic formation based at least partially on one or more of the upgoing component of the wavefield and the downgoing component of the wavefield.

9. The method of claim 1, further comprising:
displaying a visualization of the subsurface three-dimensional geologic formation based at least partially on one or more of the upgoing component of the wavefield and the downgoing component of the wavefield.

10. A method comprising:
receiving acquired data representative of a wavefield resulting from energy from at least one controlled energy source propagating into a subsurface three-dimensional geologic formation, wherein:
the acquired data is acquired using a towed marine seismic streamer that includes a pressure sensor and a particle motion sensor, and
the acquired data comprises pressure data representative of at least one pressure measurement and particle velocity data representative of at least one particle velocity measurement;
decomposing at least part of the particle velocity data to generate horizontal component particle motion data representative of a horizontal component of particle motion;
filtering the pressure data and the horizontal component particle motion data with a plurality of directional filters to provide a plurality of filtered datasets, each of the filtered datasets being associated with a directional range of a plurality of different directional ranges, the plurality of filtered datasets comprising filtered particle motion datasets;
estimating a three-dimensional angle of incidence for each of the directional ranges based at least in part on the filtering of the horizontal particle motion data;
scaling the filtered particle motion datasets based at least in part on the estimated three-dimensional angles of incidence to provide scaled components; and
deghosting the wavefield, the deghosting comprising combining the scaled components to determine an upgoing wavefield component for each of the directional ranges and merging the determined upgoing wavefield components together to determine an upgoing component of the wavefield.

11. The method of claim 10, wherein filtering the pressure data comprises filtering at least one of inline pressure gradient data and crossline pressure gradient data.

12. The method of claim 10, further comprising filtering the filtered datasets using a bandpass filter to regulate a signal-to-noise ratio.

13. The method of claim 10, further comprising using a picking technique to selectively retain and discard the filtered datasets.

14. A system comprising:
an interface to receive acquired data corresponding to a wavefield produced at least in part by energy propagating into and reflecting from a subsurface three-dimensional geologic formation, wherein:
the data is acquired with a towed marine seismic streamer that includes a pressure sensor and a particle motion sensor; and
the acquired data includes pressure data representative of at least one pressure measurement and particle motion data representative of at least one particle motion measurement; and
a processor to process the acquired data to:
filter the pressure data and the particle motion data with a plurality of directional filters to provide a plurality of filtered datasets, the filtered datasets being associated with different directional ranges;
estimate an angle of incidence for at least one of the directional ranges based at least in part on at least one of the filtered datasets;
scale at least one dataset of the plurality of filtered datasets based at least in part on the angle of incidence estimated for at least one of the directional ranges; and
determine an upgoing component of the wavefield based at least in part on the at least one estimated angle of incidence and based at least in part on a result of the scaling.

15. The system of claim 14, wherein the processor is further adapted to:
scale at least one dataset of the plurality of filtered datasets according to an operator that compensates for at least a dip-related amplitude reduction and is a function of the at least one estimated angle of incidence, and
determine the upgoing component based at least in part on a result of the scaling.

16. The system of claim 14, wherein the processor is further adapted to:
generate a plurality of scaled components of the filtered datasets; and
selectively combine the scaled components to determine the upgoing component of the wavefield.

17. The system of claim 16, wherein the processor is further adapted to selectively combine the scaled components to determine a complete representation of the wavefield.

18. The system of claim 14, wherein the particle motion data comprises particle velocity data representative of at least one particle velocity measurement, the processor being further adapted to:
   decompose the particle velocity data to generate horizontal particle velocity data representative of a horizontal component of particle motion; and
   filter the horizontal particle velocity data.

19. The system of claim 14, wherein the at least one angle of incidence comprises at least one estimated three-dimensional angle of incidence.

20. A system comprising:
   an interface adapted to receive acquired data corresponding to wavefield received from a subsurface three-dimensional geologic formation, wherein:
      the data is acquired with a towed marine seismic streamer that includes a pressure sensor and a particle motion sensor, and
      the acquired data comprises pressure data representative of at least one pressure measurement and particle velocity data representative of at least one particle velocity measurement; and
   a processor adapted to:
      decompose at least part of the particle velocity data to generate horizontal component particle motion data representative of a horizontal component of particle motion;
      filter the pressure data and the horizontal component particle motion data with a plurality of directional filters to provide a plurality of filtered datasets, each of the filtered datasets being associated with a directional range of a plurality of different directional ranges, the plurality of filtered datasets comprising filtered particle motion datasets;
      estimate a three-dimensional angle of incidence for each of the directional ranges based at least in part on the filtering of the horizontal particle motion data;
      scale the particle motion filtered datasets based at least in part on the estimated three-dimensional angles of incidence to provide scaled components; and
      selectively combine the scaled components to separate the wavefield into at least an upgoing component of the wavefield.

21. The system of claim 20, wherein the processor is further adapted to:
   filter the filtered datasets using a bandpass filter to regulate a signal-to-noise ratio.

22. The system of claim 20, wherein the processor is further adapted to:
   filter crossline pressure gradient data and inline pressure gradient data to generate the filtered particle motion datasets.

* * * * *